(12) United States Patent
Nguyen

(10) Patent No.: US 10,326,569 B2
(45) Date of Patent: Jun. 18, 2019

(54) INTER-SITE CARRIER AGGREGATION WITH PHYSICAL UPLINK CONTROL CHANNEL MONITORING

(71) Applicant: AltioStar Networks, Inc., Tewksbury, MA (US)

(72) Inventor: Si Nguyen, Tewksbury, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 15/381,939

(22) Filed: Dec. 16, 2016

(65) Prior Publication Data

US 2017/0181156 A1 Jun. 22, 2017

Related U.S. Application Data

(60) Provisional application No. 62/268,942, filed on Dec. 17, 2015.

(51) Int. Cl.
*H04L 5/00* (2006.01)
*H04W 76/15* (2018.01)
*H04W 72/04* (2009.01)

(52) U.S. Cl.
CPC ............ *H04L 5/0035* (2013.01); *H04L 5/001* (2013.01); *H04L 5/0053* (2013.01); *H04W 72/0426* (2013.01); *H04W 76/15* (2018.02)

(58) Field of Classification Search
CPC .............. H04W 76/054; H04W 76/15; H04W 72/0426; H04W 72/04; H04W 76/02; H04L 5/0035; H04L 5/0053; H04L 5/001; H04L 5/00

USPC ............................ 370/329–352; 455/456–522
See application file for complete search history.

(56) References Cited

U.S. PATENT DOCUMENTS

| 5,923,650 | A | 7/1999 | Chen et al. |
| 8,531,947 | B2 | 9/2013 | Zhao et al. |
| 8,804,744 | B2* | 8/2014 | Gao .................... H04B 7/2606 370/395.5 |
| 9,288,823 | B2* | 3/2016 | Lei ......................... H04L 1/1861 |
| 9,439,095 | B2* | 9/2016 | He .......................... H04W 4/70 |

(Continued)

FOREIGN PATENT DOCUMENTS

| CN | 101379839 A | 3/2009 |
| CN | 102396262 A | 3/2012 |

(Continued)

OTHER PUBLICATIONS

Huawei. Flow Control for Split Bearers. 3GPP TSG RAN WG3 Meeting #83bis. San Jose del Cabo, Mexico, Mar. 31-Apr. 4, 2014.

(Continued)

*Primary Examiner* — Man U Phan
(74) *Attorney, Agent, or Firm* — Mintz Levin Cohn Ferris Glovsky and Popeo, P.C.

(57) ABSTRACT

A method, a system, an apparatus, and a computer program product for providing an inter-site carrier aggregation in a wireless communication system are disclosed. Control channel resources at a primary cell in a wireless communication system are determined. The determined control channel resources are provided to a secondary cell communicatively coupled to the primary cell. At least one data packet is transmitted based on the determination of control channel resources using the secondary cell.

24 Claims, 15 Drawing Sheets

(56) References Cited

U.S. PATENT DOCUMENTS

| | | | |
|---|---|---|---|
| 9,504,029 B2* | 11/2016 | Yang | H04L 1/0076 |
| 9,788,307 B2* | 10/2017 | Yang | H04L 1/0076 |
| 9,813,219 B2* | 11/2017 | Yang | H04L 5/14 |
| 10,009,803 B2 | 6/2018 | Dahod et al. | |
| 2002/0172178 A1 | 11/2002 | Suzuki et al. | |
| 2003/0235171 A1 | 12/2003 | Lundstrom et al. | |
| 2009/0201813 A1 | 8/2009 | Speight | |
| 2009/0219951 A1 | 9/2009 | Chun et al. | |
| 2009/0252148 A1 | 10/2009 | Dolganow et al. | |
| 2010/0054231 A1 | 3/2010 | Dolganow et al. | |
| 2010/0062781 A1 | 3/2010 | Dolganow et al. | |
| 2010/0067489 A1 | 3/2010 | Pelletier et al. | |
| 2010/0113000 A1 | 5/2010 | Yao | |
| 2010/0260096 A1 | 10/2010 | Ulupinar et al. | |
| 2010/0260097 A1 | 10/2010 | Ulupinar et al. | |
| 2011/0034175 A1 | 2/2011 | Fong et al. | |
| 2011/0242975 A1 | 10/2011 | Zhao et al. | |
| 2011/0267951 A1 | 11/2011 | Stanwood et al. | |
| 2011/0310839 A1 | 12/2011 | Kenington et al. | |
| 2012/0163298 A1 | 6/2012 | Zhou et al. | |
| 2012/0188953 A1 | 7/2012 | Won et al. | |
| 2012/0230248 A1 | 9/2012 | Gao et al. | |
| 2012/0257581 A1 | 10/2012 | De | |
| 2012/0263120 A1 | 10/2012 | Gopalakrishnan et al. | |
| 2012/0300710 A1* | 11/2012 | Li | H04W 88/085 370/329 |
| 2012/0300747 A1 | 11/2012 | Westberg et al. | |
| 2013/0051329 A1 | 2/2013 | Take | |
| 2013/0083730 A1 | 4/2013 | Gaal et al. | |
| 2013/0163524 A1 | 6/2013 | Shatzkamer et al. | |
| 2013/0188619 A1 | 7/2013 | Dinan | |
| 2013/0201890 A1 | 8/2013 | Swaminathan et al. | |
| 2013/0223272 A1 | 8/2013 | Tao et al. | |
| 2013/0272181 A1 | 10/2013 | Fong et al. | |
| 2013/0301609 A1 | 11/2013 | Smith et al. | |
| 2014/0010125 A1 | 1/2014 | Tillman et al. | |
| 2014/0018090 A1 | 1/2014 | Khoryaev et al. | |
| 2014/0029458 A1 | 1/2014 | Ye | |
| 2014/0043980 A1 | 2/2014 | Anthony et al. | |
| 2014/0120936 A1 | 5/2014 | Chen et al. | |
| 2014/0120947 A1 | 5/2014 | Siomina | |
| 2014/0204895 A1* | 7/2014 | Frederiksen | H04W 88/085 370/329 |
| 2014/0226481 A1 | 8/2014 | Dahod et al. | |
| 2014/0233413 A1 | 8/2014 | Dahod et al. | |
| 2014/0233459 A1 | 8/2014 | Dahod et al. | |
| 2014/0233479 A1 | 8/2014 | Dahod et al. | |
| 2015/0009923 A1* | 1/2015 | Lei | H04W 72/0413 370/329 |
| 2015/0312904 A1 | 10/2015 | Ma et al. | |
| 2015/0326456 A1 | 11/2015 | Dudda et al. | |
| 2015/0327236 A1 | 11/2015 | Lin | |
| 2015/0341923 A1 | 11/2015 | Yang et al. | |
| 2016/0057768 A1 | 2/2016 | Sun et al. | |
| 2016/0182286 A1 | 6/2016 | Lunden et al. | |
| 2016/0353430 A1* | 12/2016 | Chen | H04W 72/0413 |
| 2017/0048912 A1 | 2/2017 | Sharma et al. | |
| 2017/0295517 A1 | 10/2017 | Nguyen et al. | |
| 2017/0295591 A1 | 10/2017 | Nguyen et al. | |
| 2017/0318577 A1* | 11/2017 | Yang | H04W 72/042 |
| 2018/0035436 A1 | 2/2018 | Sharma et al. | |
| 2018/0077587 A1 | 3/2018 | Al-Fanek et al. | |
| 2018/0123920 A1 | 5/2018 | Dudda et al. | |
| 2018/0167889 A1 | 6/2018 | Rajagopal et al. | |
| 2018/0310207 A1 | 10/2018 | Dahod et al. | |

FOREIGN PATENT DOCUMENTS

| | | |
|---|---|---|
| CN | 104137644 A | 11/2014 |
| EP | 1189388 A2 | 3/2002 |
| EP | 2 200 390 A2 | 6/2010 |
| EP | 2 501 141 A2 | 9/2012 |
| EP | 2523505 A1 | 11/2012 |
| EP | 2 530 988 A1 | 12/2012 |
| EP | 2747376 A1 | 6/2014 |
| EP | 2947903 A1 | 11/2015 |
| GB | 2525935 A | 11/2015 |
| JP | 2012523805 A | 10/2012 |
| JP | 2014-515584 A | 6/2014 |
| WO | WO-2010120828 A1 | 10/2010 |
| WO | WO-2011/080714 A2 | 7/2011 |
| WO | WO-2012/084636 A1 | 6/2012 |
| WO | WO-2012/139016 A2 | 10/2012 |
| WO | WO-2012/139664 A1 | 10/2012 |
| WO | 2012/163726 A1 | 12/2012 |
| WO | WO-2012/177763 A2 | 12/2012 |
| WO | WO-2013/038167 A2 | 3/2013 |
| WO | WO-2013029251 A1 | 3/2013 |
| WO | WO-2013116988 A1 | 8/2013 |
| WO | WO-2014/127054 A1 | 8/2014 |
| WO | WO-2014/130708 A1 | 8/2014 |
| WO | WO-2014/130709 A1 | 8/2014 |
| WO | WO-2014/130713 A1 | 8/2014 |
| WO | WO-2014/160709 A2 | 10/2014 |
| WO | WO-2014/160718 A1 | 10/2014 |
| WO | WO-2014/160722 A1 | 10/2014 |
| WO | WO-2015167546 A1 | 11/2015 |
| WO | 2017/005854 A1 | 1/2017 |

OTHER PUBLICATIONS

International Search Report and Written Opinion for PCT/US2017/026792, dated Jul. 17, 2017.

International Search Report and Written Opinion for Application No. PCT/US2017/026793 dated Aug. 18, 2017.

Kuwano et al., Optical Access Technologies for Mobile Radio Access Network. IEICE Technical Report. Jan. 2013;112(401):121-5. [Japanese language document with English abstract].

Office Action for Japanese Application No. 2015-558115 dated Aug. 8, 2017.

Balakrishnan, et al., (1995); "Improving Reliable Transport and Handoff Performance in Cellular Wireless Networks", Wireless Networks, ACM, 1:469-481.

Border et al., (2001); "Performance Enhancing Proxies Intended to Mitigate Link-Related Degradations", Network Working Group Request for Comments: 3135; pp. 1-45.

Du, et al., (2009); "Downlink Scheduling for Multimedia Multicast/Broadcast over Mobile WiMAX: Connection-Oriented Multistate Adaptation", IEEE Wireless Communications, pp. 72-79.

International Search Report for PCT/US2014/016123, dated Jul. 22, 2014.

International Search Report for PCT/US2014/017456, dated Jul. 3, 2014.

International Search Report for PCT/US2014/017459, dated Jul. 3, 2014.

International Search Report for PCT/US2014/017464, dated Jun. 16, 2014.

International Search Report for PCT/US2014/031725, dated Oct. 7, 2014.

International Search Report for PCT/US2014/031744, dated Sep. 4, 2014.

International Search Report for PCT/US2014/031749, dated Aug. 5, 2014.

International Search Report for PCT/US2014/031753, dated Aug. 14, 2014.

Yoon, et al., (2012); "MuVi", Mobile Computing and Networking, ACM, pp. 209-220.

CATT. L1 support for dual connectivity. 3GPP TSG RAN WG1 Meeting #74, Barcelona, Spain, Aug. 19-23, 2013.

International Search Report and Written Opinion for PCT/US2016/067271, dated Mar. 16, 2017.

International Search Report with Written Opinion corresponding to International Patent Application No. PCT/US2016/017585, dated Dec. 20, 2016, 12 pages.

* cited by examiner

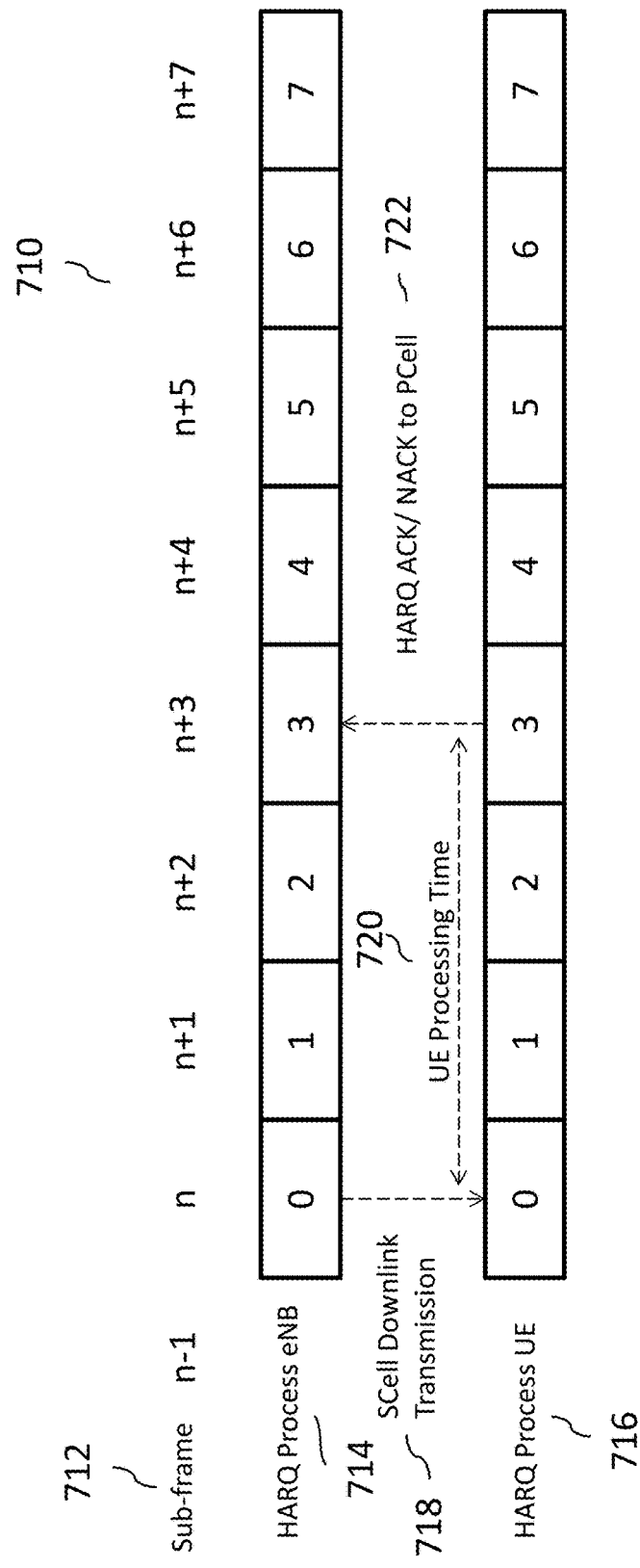

INTER-SITE CARRIER AGGREGATION WITH PHYSICAL UPLINK CONTROL CHANNEL MONITORING

CROSS-REFERENCE TO RELATED APPLICATIONS

The present application claims priority to U.S. Provisional Patent Appl. No. 62/268,942 to Nguyen, filed Dec. 17, 2016, and entitled "Inter-Site Carrier Aggregation With PUCCH Sniffing", and incorporates its disclosure herein by reference in its entirety.

The present application relates to U.S. patent application Ser. No. 14/179,421, filed Feb. 12, 2014 to Dahod et al., and entitled "Long Term Evolution Radio Access Network," which claims priority to U.S. Provisional Patent Application No. 61/763,927, filed Feb. 12, 2013, and entitled "Long Term Evolution (LTE) Radio Access Network (Ran) Architecture," and incorporates their disclosures herein by reference in their entireties.

TECHNICAL FIELD

The subject matter described herein generally relates to data processing and in particular, to inter-site carrier aggregation with physical uplink control channel ("PUCCH") monitoring in wireless communications system, such as a long term evolution network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications between users in existing digital cellular networks are typically defined and/or affected by various factors and/or parameters. These can include latency. Latency can be measured as either one-way (the time from the source sending a packet to the destination receiving it), or a round-trip delay time (the one-way latency from source to destination plus the one-way latency from the destination back to the source). While the existing LTE systems were designed to increase speed of communications by reducing significant latency that plagued its predecessors, such systems are still affected by a substantial amount of latency when mobile users setup communications via the LTE systems. Further, the current LTE systems involve components that are costly and expensive to install and maintain.

A variety of vendors is available for users to choose from for provision of wireless services. To provide effective communication for the users, carrier aggregation can be implemented in the wireless networks. Using carrier aggregation, it is possible to simultaneously schedule a user on multiple component carriers for downlink or uplink data transmission. However, such simultaneous scheduling can result in scheduling and load balancing problems across network. Additionally, in various networks, carriers can belong to different frequency bands, which can result in significant differences in coverage between carriers. Further, at different locations in the network, some users can be scheduled on only a few select carriers while others can have access to an entire set of carriers. Thus, there is a need to provide a better inter-site carrier aggregation in order to allow for effective scheduling of users, reduction of latency, improved connectivity and quality of service.

SUMMARY

In some implementations, the current subject matter relates to a computer implemented method for providing an inter-site carrier aggregation in a wireless communication system. The method can include determining control channel resources at a primary cell in a wireless communication system, providing the determined control channel resources to a secondary cell communicatively coupled to the primary cell, and transmitting at least one data packet based on the determination of control channel resources using the secondary cell. At least one of the determining, the providing, and the transmitting can be performed by at least one processor of at least one computing system.

In some implementations, the current subject matter can include one or more of the following optional features. The primary cell and the second cell can include at least a portion of an evolved node (eNodeB) base station. The primary cell and the secondary cell can include a remote radio head. The remote radio head can include a radio transmitter and a radio receiver. In some implementations, the secondary cell can include a first remote radio head and a second remote radio head. One of the first and second remote radio heads can be used to communicate with the primary cell and, while the other can be used to communicate with a user equipment. Alternatively, one or both remote radio heads can communicate with both the primary cell and the user equipment.

In some implementations, the primary cell and the secondary cell can include at least one of the following: a portion of a macro base station, a portion of a micro base station, a portion of a femto base station, a portion of a pico base station, and any combination thereof.

In some implementations, the method can include receiving, by one of the primary cell and the secondary cell, a control channel information from a user equipment, determining, based on the receiving, the control channel resources, transmitting, by the primary cell, the determined control channel resources to the secondary cell, and utilizing, by the secondary cell, the determined control channel resources for transmission of the data packet(s) between the secondary cell and the user equipment. The method can also include receiving, using one of the primary cell and the secondary cell, physical uplink control channel and physical uplink shared channel information.

In some implementations, the method can be performed using inter-site carrier aggregation.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 7b illustrates exemplary operation process of the system shown in FIG. 7a;

DETAILED DESCRIPTION

To address the deficiencies of currently available solutions, one or more implementations of the current subject matter provide for an inter-site carrier aggregation in a wireless communication system, such as a system that can be implemented in long-term evolution ("LTE") network having an intelligent capability. In particular, the inter-site carrier aggregation can be implemented with physical uplink control channel ("PUCCH") listening or monitoring/sniffing. As stated above, some implementations of the current subject matter can be implemented in a long-term evolution communications system. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
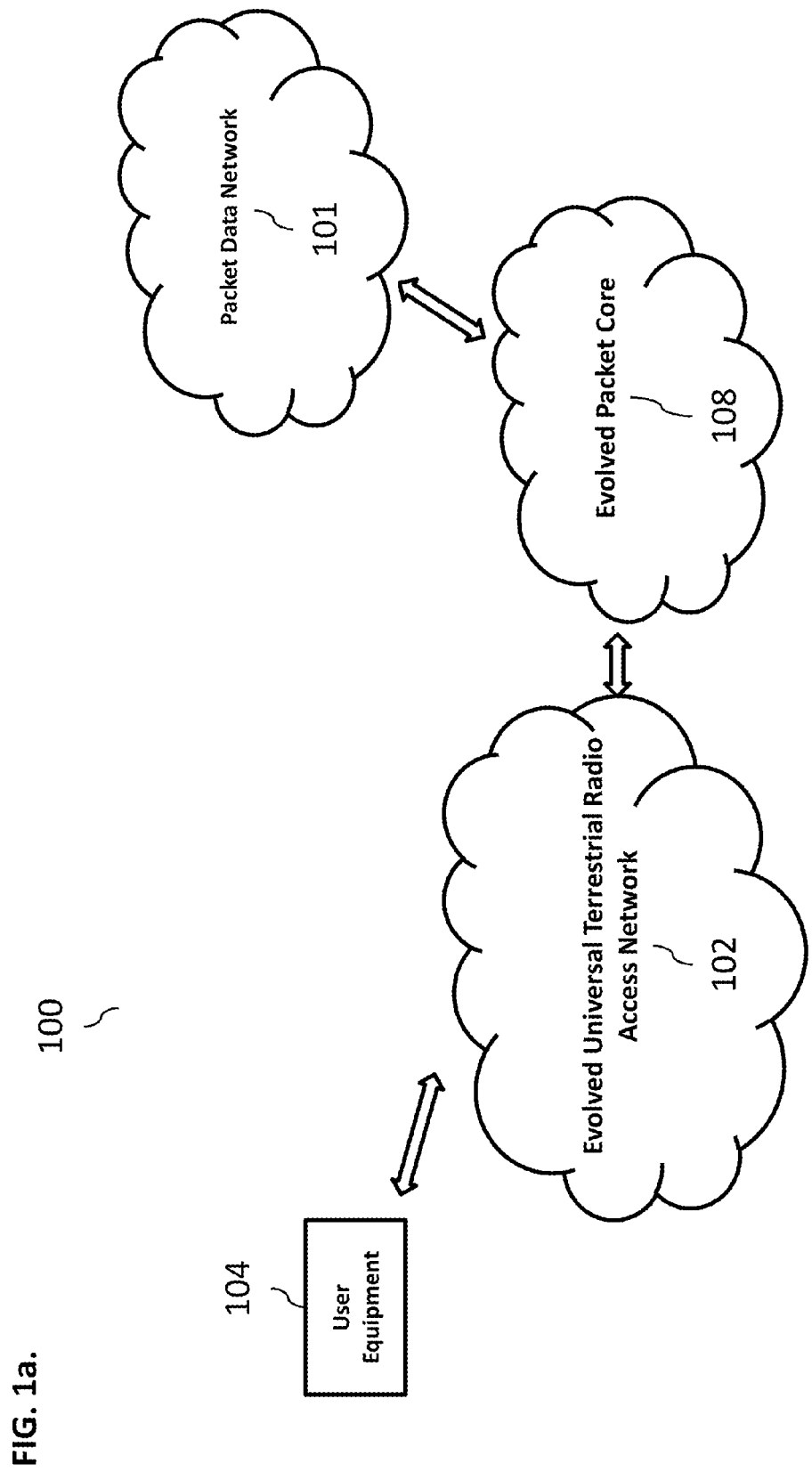
FIG. 1a illustrates an exemplary conventional long term evolution ("LTE") communications system.
Figure 1B:
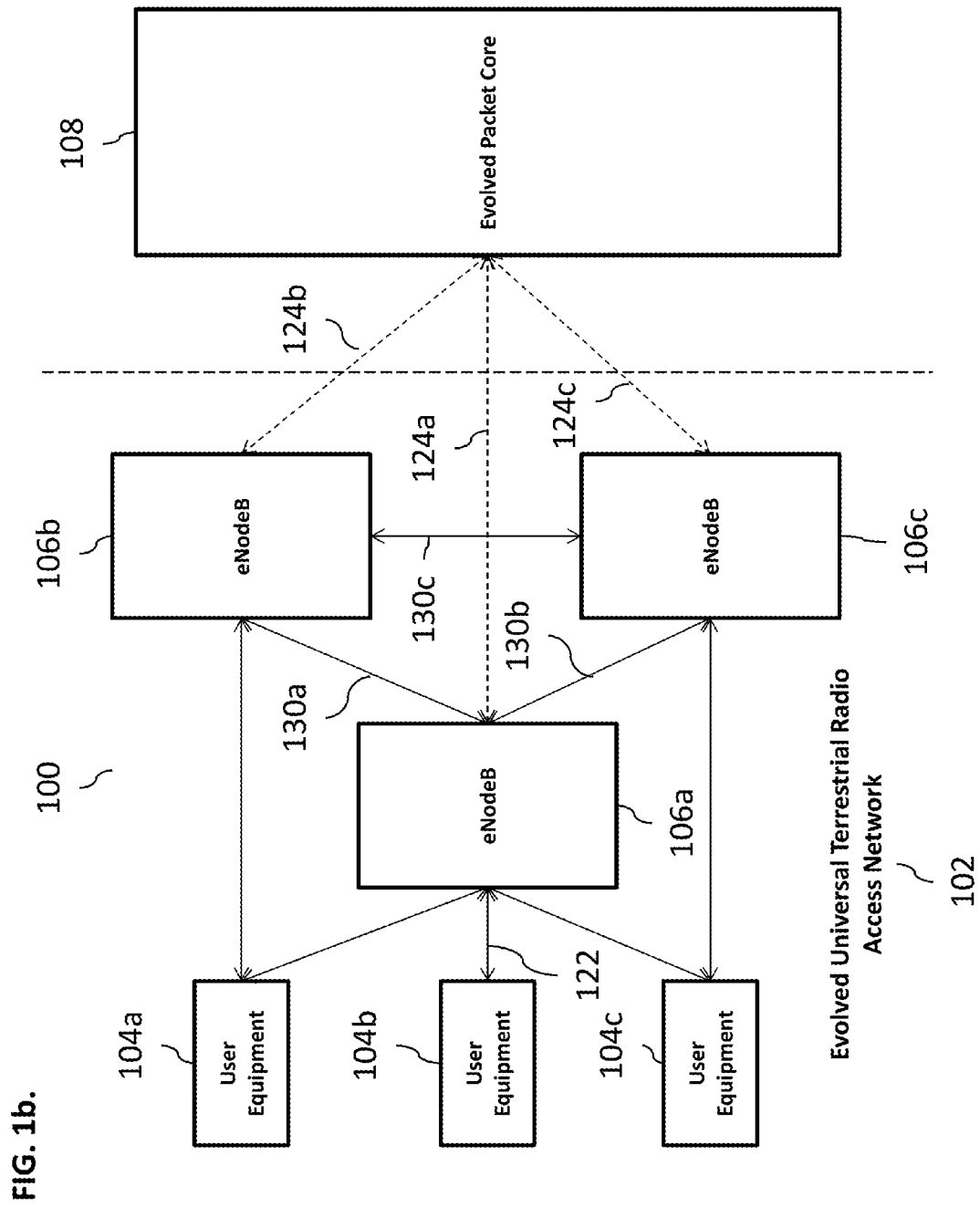

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
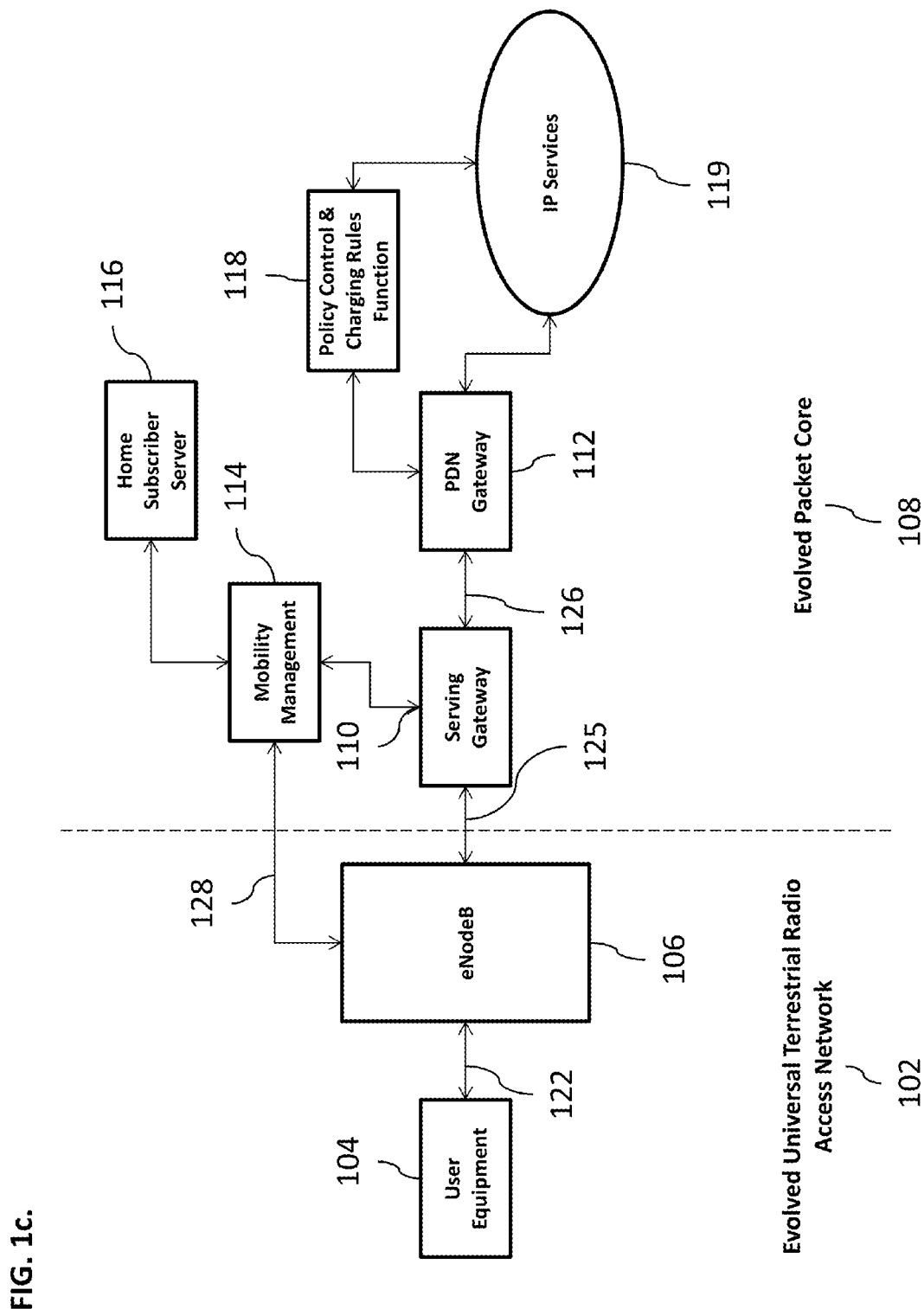

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
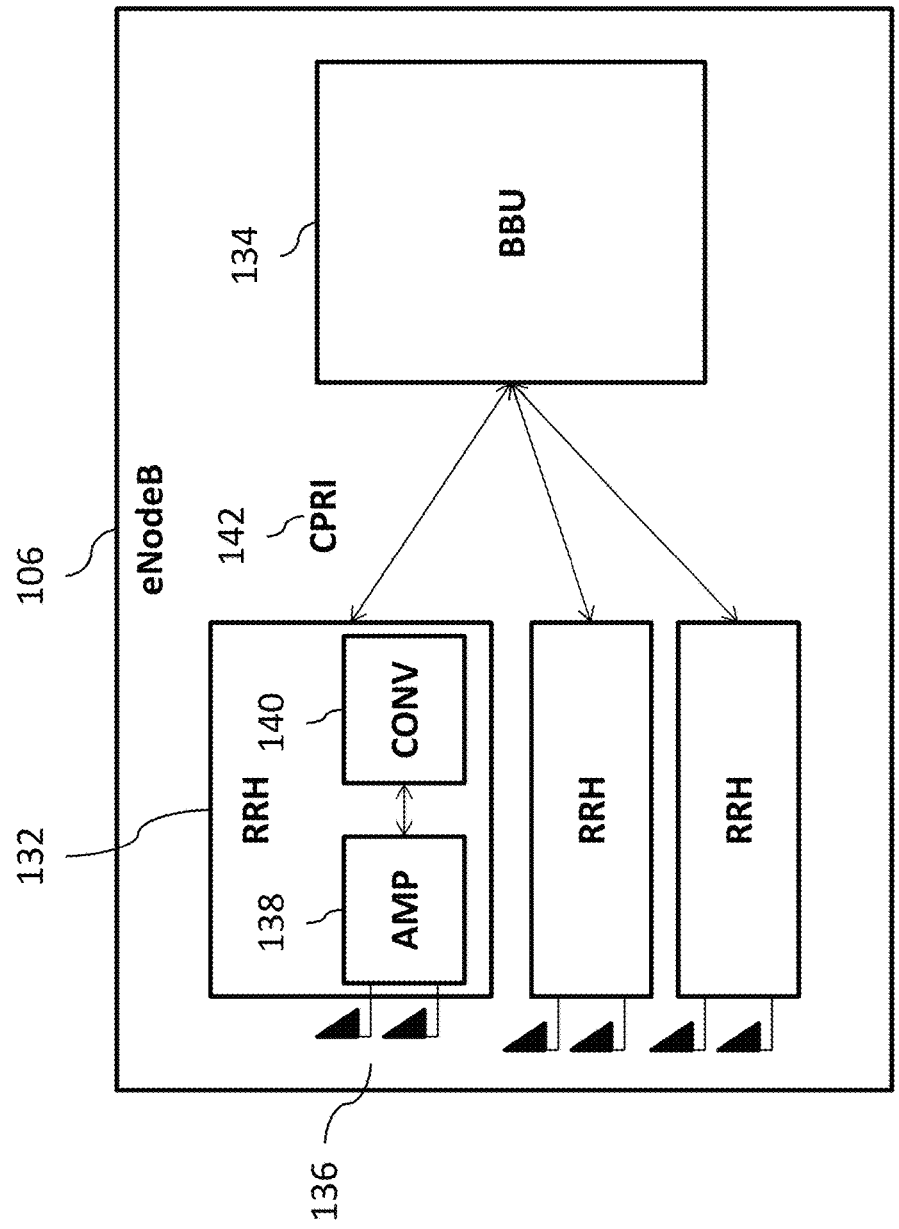

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
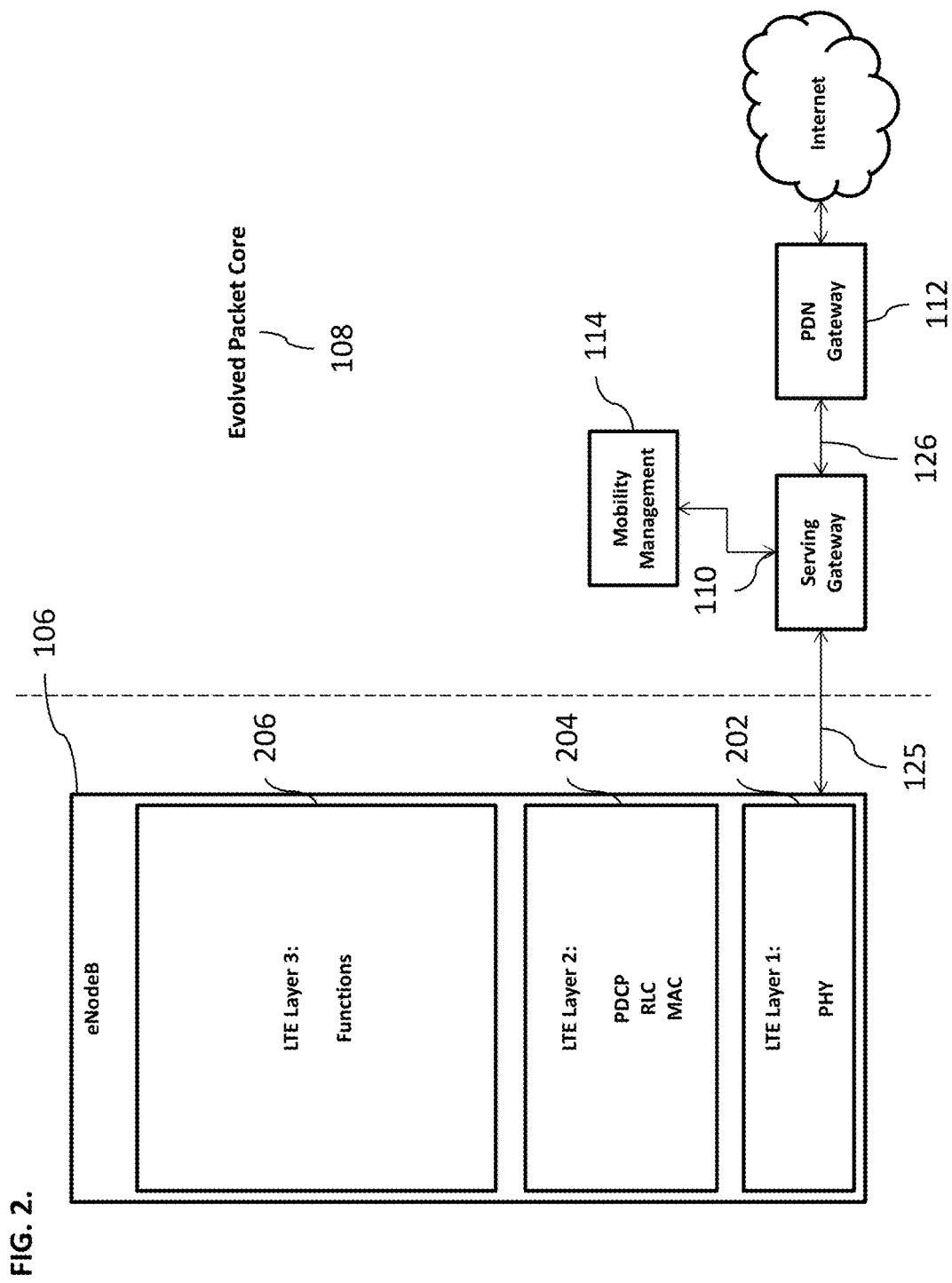
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
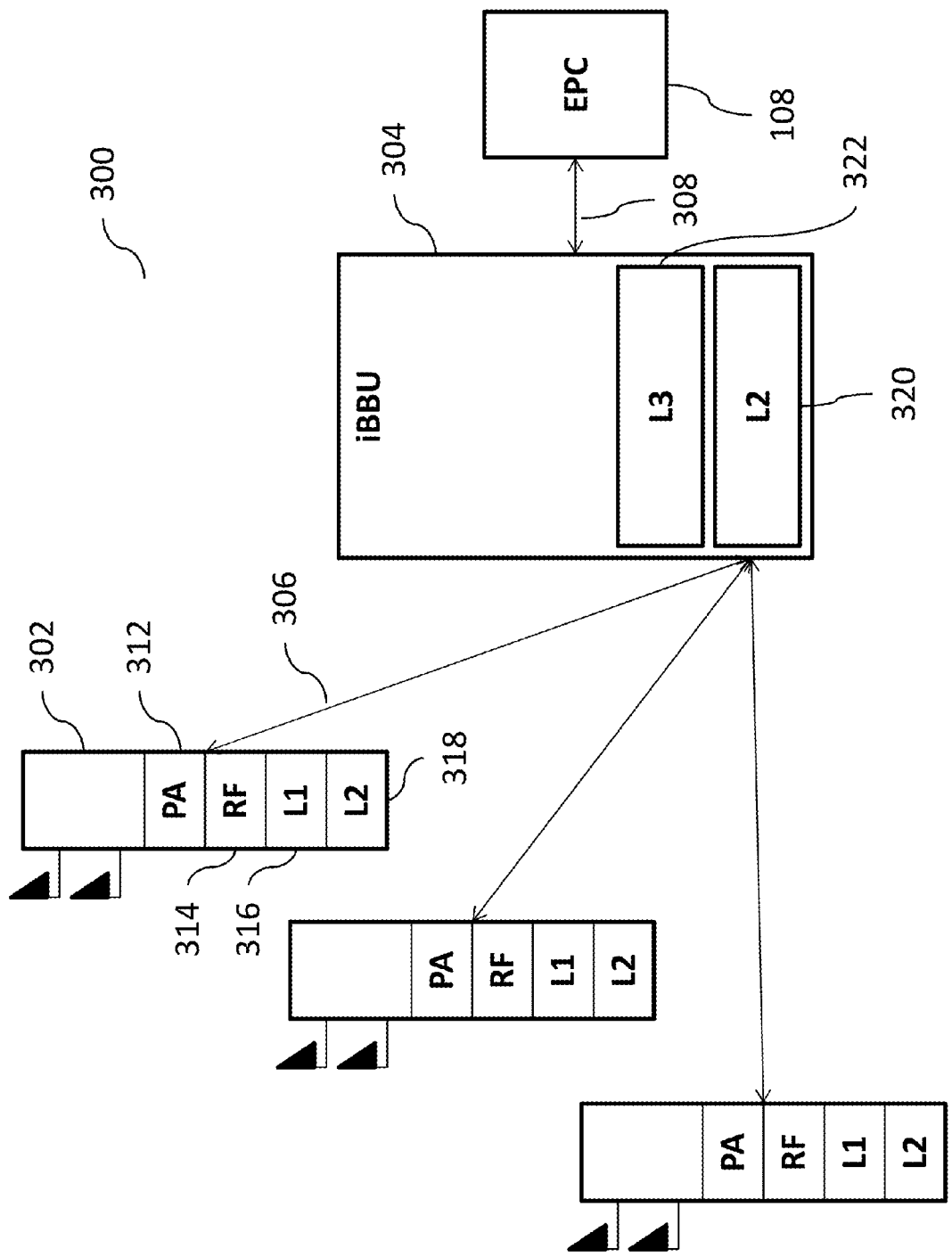
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

In some implementation, the system 300 can implement carrier aggregation ("CA"). The CA features have been discussed in the 3GPP standards for 4G LTE-Advanced, Releases 10 and 11, respectively. Both features are designed to increase data throughput rate and designed to work with 4G LTE-Advanced. The following is a brief summary of each of these features.

A. Carrier Aggregation

The CA or channel aggregation enables multiple LTE carriers to be used together to provide high data rates that are required for 4G LTE-Advanced. These channels or carriers can be in contiguous elements of the spectrum, or they may be in different bands. The carriers can be aggregated using contiguous intra-band carrier aggregation, non-contiguous intra-band carrier aggregation, and inter-band non-contiguous carrier aggregation. In the contiguous intra-band carrier aggregation, carriers are adjacent to one another and aggregated channel can be considered by a user equipment as a single enlarged channel from a radio frequency ("RF") viewpoint and only one transceiver is required within the user equipment (usually, more transceivers are required where the channels are not adjacent). In the non-contiguous intra-band carrier aggregation typically requires two transceivers and a multi-carrier signal is not treated as a single signal. In the inter-band non-contiguous carrier aggregation, multiple transceivers are required to be present within a single user equipment, which can affect cost, performance and power. Additionally, this aggregation technique can require reduction in intermodulation and cross modulation from the two transceivers. When carriers are aggregated, each carrier can be referred to as a component carrier. There exist two categories of component carriers: a primary component carrier (i.e., main carrier in any group; there are a primary downlink carrier and an associated uplink primary component carrier), and a secondary component carrier (there are one or more secondary component carriers). Association between downlink primary and corresponding uplink primary component carriers is cell specific.

When LTE carrier aggregation is used, it is necessary to be able to schedule the data across the carriers and to inform the terminal of the DCI rates for different component carriers. Cross-carrier scheduling can be achieved individually via RRC signaling on a per component carrier basis or a per user equipment basis. When no cross-carrier scheduling is arranged, the downlink scheduling assignments can be achieved on a per carrier basis. For the uplink, an association can be created between one downlink component carrier and an uplink component carrier. When cross-carrier scheduling is active, the physical downlink shared channel ("PDSCH") on the downlink or the physical uplink shared channel ("PUSCH") on the uplink is transmitted on an associate component carrier other than the physical downlink control channel ("PDCCH"), the carrier indicator in the PDCCH provides the information about the component carrier used for the PDSCH or PUSCH. The PDSCH is the main data bearing channel allocated to users on a dynamic basis and that carries data in transport blocks ("TB") that correspond to a MAC packet data unit ("PDU"), which are passed from the MAC layer to the PHY layer once per transmission time interval ("TTI") (i.e., 1 ms). The PUSCH is a channel that carries user data and any control information necessary to decode information such as transport format indicators and MIMO parameters. The PDCCH is a channel that carries resource assignment for user equipments, which are contained in a downlink control information ("DCI") message.

There exist five deployment scenarios for CA. In the first scenario, cells (e.g., F1 and F2 cells) can be co-located and overlaid, thereby providing nearly the same coverage. Both layers provide sufficient coverage and mobility can be supported on both layers. In the second scenario, cells F1 and F2 can be co-located and overlaid, however, F2 cells have smaller coverage due to larger path losses, where only F1 cells provide sufficient coverage and F2 cells are used to improve throughput. Here, mobility is performed based on F1 cells coverage. In the third scenario, F1 and F2 cells are co-located and overlaid, however, F2 cells have smaller coverage due to larger path losses, where only F1 cells provide sufficient coverage and F2 cells are used to improve throughput. Here, mobility is based on F1 cells coverage. In the fourth scenario, F1 cells provide macro coverage and F2 cells' remote radio heads are used to improve throughput at hot spots, where mobility is again performed based on F1 cells coverage. In the fifth scenario, which is similar to the second scenario, frequency selective repeaters are deployed so that coverage is extended for one of the carrier frequencies. It is expected that F1 and F2 cells of the same eNodeB can be aggregated where coverage overlaps.

B. Ethernet-Based Front Haul in Intelligent LTE RAN

Figure 4:
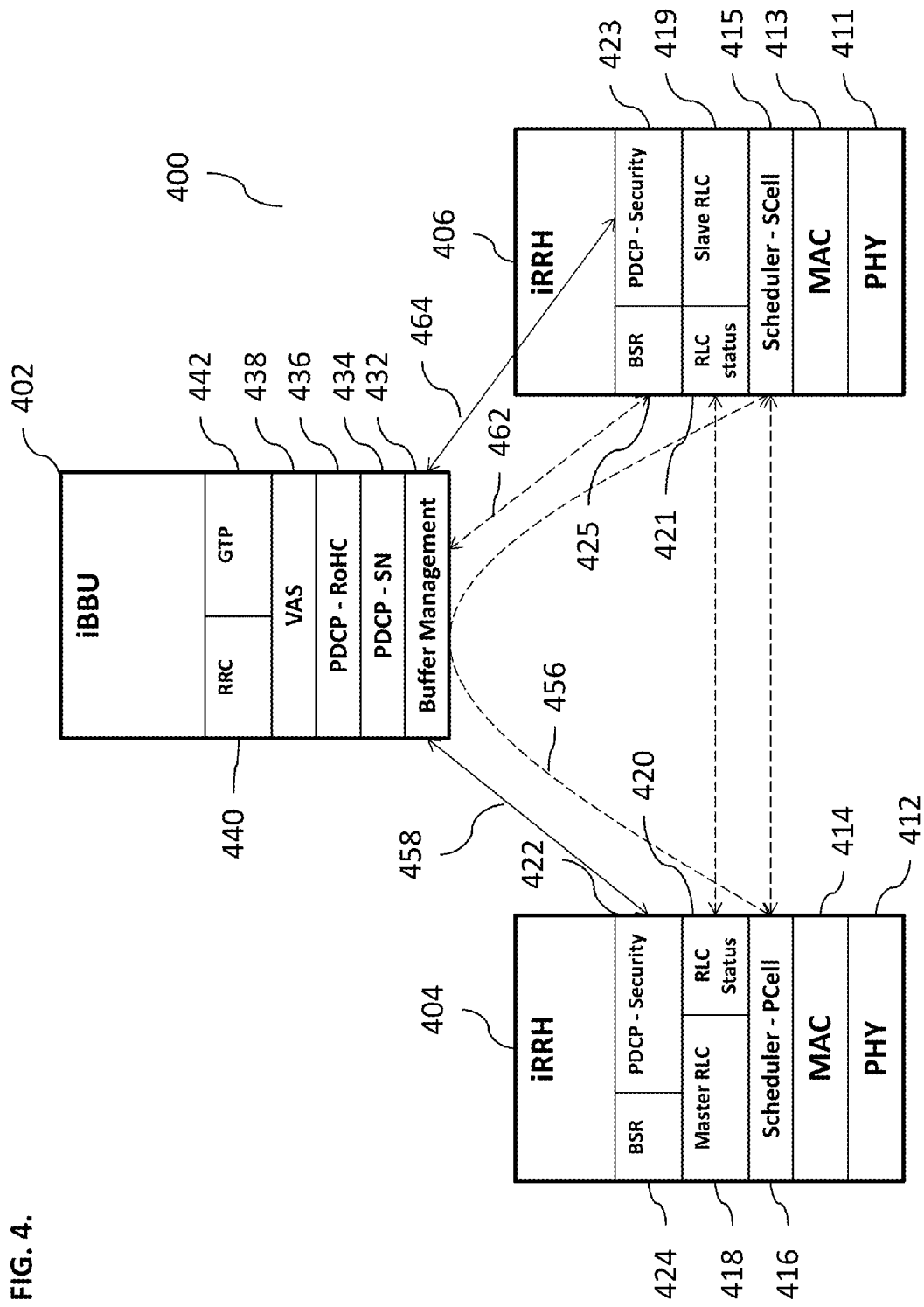
FIG. 4 illustrates an exemplary intelligent Long Term Evolution Radio Access Network implementing carrier aggregation feature, according to some implementations of the current subject matter.

FIG. 4 illustrates an exemplary system 400, according to some implementations of the current subject matter. The system 400 can be configured to implement 4G LTE-Advanced features, including carrier aggregation feature. The system 400 can include an intelligent baseband unit ("iBBU") 402, a primary cell ("Pcell") intelligent remote radio head 404 and one or more secondary cells ("Scell") intelligent remote radio heads 406. In LTE CA, the Pcell is the serving cell where the UE has an RRC connection with the radio access network. Pcell can only be changed through a successful execution of a handover procedure. Scell is a secondary cell that can be added/removed from the configured cells list when the UE moves into/out of its coverage area. The configuration of a Scell is done by RRC based on mobility measurement events triggered in the UE and sent to RRC.].

As shown in FIG. 4, each iRRH 404 and 406 can both include the LTE layer 1 (i.e., the PHY layer) and have LTE layer 2 (i.e., MAC, PDCP, RLC) split among themselves as well as iBBU 402. The iRRH 404 can include a PHY layer 412, a MAC layer 414, a scheduler-Pcell component 416, a master RLC component 418, a RLC status component 420, a PDCP-security component 422, and a BSR component 424. Similarly, the iRRH 406 can include a PHY layer 411, a MAC layer 413, a scheduler-Scell component 415, a slave RLC component 419, a RLC status component 421, a PDCP-security component 423, and a BSR component 425. The iBBU 402 can include a buffer management component 432, a PDCP-SN component 434, a PDCP-RoHC component 436, a VAS component 438, an RRC component 440, and a GTP component 442.

The buffer management component 432 can implement use of buffer occupancy reports that can be received from the iRRH's to control flow of user data to the Pcell and/or Scell in order to enable in sequence delivery of the data to the user equipment. The PDCP-SN component 434 can perform sequence numbering of the PDCP service data units ("PDCP SDUs"). The PDCP robust header compression ("PDCP-RoHC") component 436 can perform IP header compression for voice-over-LTE service flows. The value added services ("VAS") component 438 can provide application intelligence in the eNodeB by performing shallow packet inspection and deep packet inspection of data flows. This component can also determine how a particular data flow can be treated. A shallow packet inspection ("SPI") can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection ("DPP") can be performed by examining other layers of the data packet. In some implementations, the payload of a data packet can be inspected to determine what resource blocks should be assigned to the data packet.

The iRRH 404 and the iRRH 406 can communicate with one another via an inter-iRRH interface, which can be a direct connection 452, or a connection that can be shared with a fronthaul connection 458. The iRRH 404 can communicate with the iBBU 402 using the fronthaul ("FH") connection 458 and the iRRH 406 can communicate with the iBBU 402 using FH connection 464.

In some implementations, the iBBU 402 can provide a centralized remote radio resource control ("RRC") using RRC component 440, thereby eliminating a need for a long-delay inter-RRC coordination and providing an ability to configure LTE layer 2 in iRRH 404 and 406. This capability can be implemented as part of the coordinated multipoint transmission feature, as discussed below.

As shown in FIG. 4, the functionalities associated PDCP protocol can be split among the iBBU 402, the iRRH 404, and the iRRH 406. The PDCP-ROHC 436 (where ROHC refers to robust header compression protocol that is used to compress packets) and the PDCP-SN 434 (where SN refers to sequence numbering) together with buffer management component 432 in iBBU 402 can be referred to as PDPC-upper, and PDCP-security 422, 423 in iRRH 404, 406, respectively, can be referred to as PDCP-lower. By having PDCP-upper in the iBBU 402 and PDCP-lower in iRRH 404, 406, the PDCP functionalities can be centralized to handle the ROHC and sequence numbering functions by the iBBU 402, and ciphering functions by the iRRH (which refer to known functionalities of the PDPC). In some implementations, the PDCP-upper in iBBU 402 can also handle coordination of data flows to the schedulers in the iRRHs.

Further, by using PDCP-upper and PDCP-lower, flow control between iBBU 402 and iRRH 406 can be provided. The flow control can depend on an estimated data rate for the bearer. For example, on the downlink 462, the PDCP-upper can send compressed and numbered packets to Pcell iRRH 404 and Scell iRRH 406 in proportion based on buffer occupancy level and estimated data rate from the reports provided by PDCP-lower. In some implementations, the PDCP-lower can generate a report of a buffer occupancy level. This report can be generated periodically, upon request, automatically, manually, and/or on for any period of time. Based on the report, the PDCP-upper can estimate a buffer draining rate based on consecutive buffer occupancy reports (e.g., two reports), a time that elapsed between the reports and the additional data that was sent to the buffer between the reports.

The iBBU 402 can include a buffer management function 432 to support the in-sequenced delivery of PDCP packet data units ("PDCP PDU") and support value added services ("VAS") multi-queue implementation for the default bearer. The buffer management function 432 can detect buffer stalling in the Scell 406 and trigger a redirection of the staled PDCP PDU packets to the Pcell 404. PDCP-lower can detect outdated packets and discard them from its buffer. The in-sequenced delivery of PDCP PDUs can refer to a requirement for data flow transmitted in RLC acknowledged and unacknowledged modes. VAS multi-queue implementation can enable prioritization of data flows within the default bearer. In some implementations, the detection of buffer stalling can be based on an estimated buffer drain rate that can be derived from the buffer occupancy reports received from the PDCP-lower.

In some implementations, to perform redirection of packets, the PDCP-upper can tag each packet data unit with time-to-live information (which can refer to an amount of time before a data packet expires). Then, the PDCP-lower can remove the packet from its buffer when the time-to-live timer for that packet expires and inform the PDCP-upper of the deleted packet's number. The PDCP-upper can decide whether to resend the deleted packet to the same PDCP-lower and/or redirect the deleted packet to a PDCP-lower of another iRRH. The discarding of packets can be performed on the Pcell and/or the Scell and the packets can be redirected toward the Pcell and/or the Scell.

In some implementations, the RLC protocol handling can be split between iRRH 404 and iRRH 406, where the iRRH 404 can include a master RLC component 418 and the iRRH 406 can include a slave RLC component 419. The master RLC component 418 can allocate an RLC PDU sequence number to the slave RLC component 419, thereby centralizing RLC PDU sequence numbering process. In the current subject matter system, each RLC entity can maintain a list of unacknowledged PDUs that it has transmitted and thus, handle the ARQ procedures for only those unacknowledged PDUs that it has transmitted. This is because the RLC entity might not be aware of other PDUs that can be sent by other entities and/or might not have the original data to handle the re-transmissions of the unacknowledged PDUs. In some implementations, an RLC ARQ status PDU, which can be sent from a user equipment at a rate of once very few 10's of a millisecond, can be shared between the two RLC entities over the inter-iRRH interface, i.e., the direct connection 452 and/or a connection shared with fronthaul 458. In some implementations, the physical connection for this inter-iRRH interface can either be direct and/or through a L2 Ethernet switch. In some implementations, the above inter-iRRH interface can leverage industry standard stream control transport protocol ("SCTP") over IP. The application layer information exchange can be based on an inter-process communication protocols.

In some implementations, the inter-iRRH interface 452 can provide a low latency interface for sharing of the RLC status information PDUs as well as any other information between iRRHs 404 and 406. Channel state information ("CSI"), acknowledgement/non-acknowledgement ("ACK/NACK") signaling, precoding matrix indicator ("PMI"), and rank indicator ("RI") that are received by the Pcell iRRH 404 can be forwarded over the inter-iRRH interface 452 for sharing with an Scell scheduler 415 via the fronthaul or direct gigabit Ethernet ("GE") connection. This information can be available to the Scell scheduler on the same subframe that it was sent in order not to incur any impact the H-ARQ RTT, which can be targeted to be 8 ms. The Scell scheduler can also accommodate longer delay in obtaining the H-ARQ feedback and can impact H-ARQ round trip time on the Scell.

In some implementations, the inter-iRRH interface 452 can be used by the Scell iRRH 406 to inform the Pcell iRRH 404 which PUCCH resource to expect the arrival of the H-ARQ ACK/NACK feedback for a packet sent on the Scell (where the allocation of PUCCH resources is defined in the 3GPP Standards for 4G LTE). By way of a non-limiting example, the scheduler can be designed to determine which user equipment to schedule 2 ms in advance of when the data is transmitted over the air. The H-ARQ ACK/NACK can be sent from the user equipment 4 ms after the data has been received. Thus, to ensure the Pcell iRRH 404 is informed of the PUCCH resource usage before the downlink H-ARQ ACK/NACK information arrives from the user equipment, an exemplary one-way latency for the inter-iRRH interface 452 might not be more than 4 ms. As can be understood, the above is provided as an illustrative non-limiting, exemplary implementation of the current subject matter system. It should be further understood that the current subject matter system is not limited to specific data scheduling parameters and/or particular latency associated with transmission of data, and can be designed using any scheduling, latency and/or any other parameters.

In some implementations, the inter-iRRH transport 456 can be shared with the fronthaul and switched at the iBBU 402 and/or a physical direct connection 452 between the iRRHs 404, 406 using a gigabit Ethernet interface. When the inter-iRRH interface is configured as a switched connection 456 across the fronthaul, the fronthaul latency can be based on a very low latency transport such as in the case when the iBBU 402 and the iRRHs 404 and/or 406 are collocated and/or when based on LOS wireless transport such as MW, mmWave, FSO, when the iRRH's are geographically separated.

IV. Inter-Site Carrier Aggregation with PUCCH Listening

Figure 5:
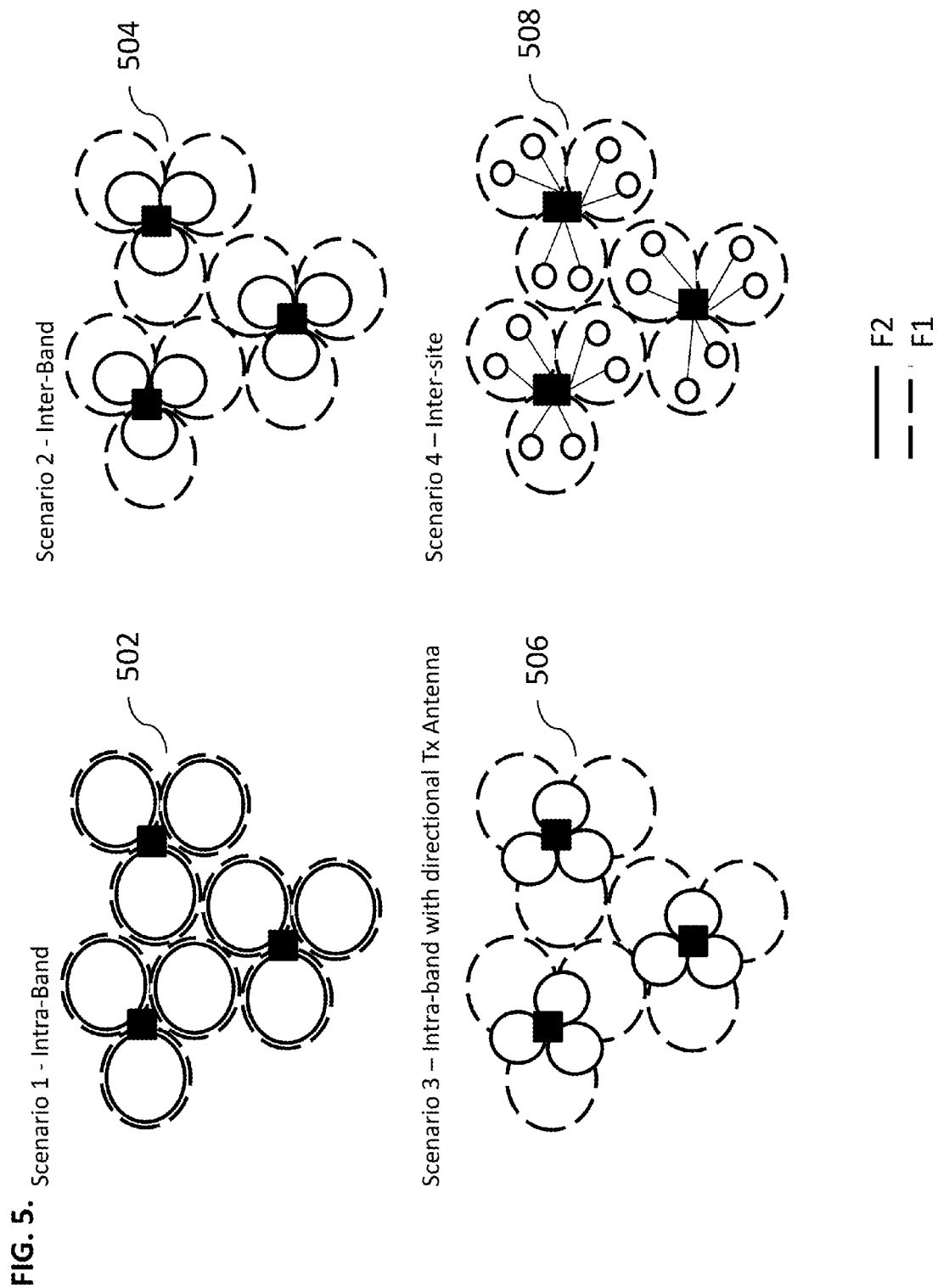
FIG. 5 illustrates various carrier aggregation ("CA") scenarios.

FIG. 5 illustrates carrier aggregation ("CA") scenarios 1, 2, 3, 4 (502, 504, 506, 508). CA scenario 1 502 is an intra-band scenario which includes three geographically co-located sites, each serving a predetermined cell area at particular frequency bands F1 (shown by dashed lines) and F2 (shown by solid lines). CA scenario 2 504 is an inter-band scenario that includes three geographically co-located sites, where each site is served at frequency band F2 and another at frequency band F1 (which can serve more distant area away from the cell site). CA scenario 3 506 is an intra-band with direction transmission (Tx) antenna scenario, where each of the three sites operate at a particular frequency band F2 and a transmission frequency band F1. The CA scenario 4 508 is an inter-site scenario, where each site can provide a macro coverage at frequency F2 and be communicatively coupled to remote radio heads operating at another frequency band F1.

Figure 6:
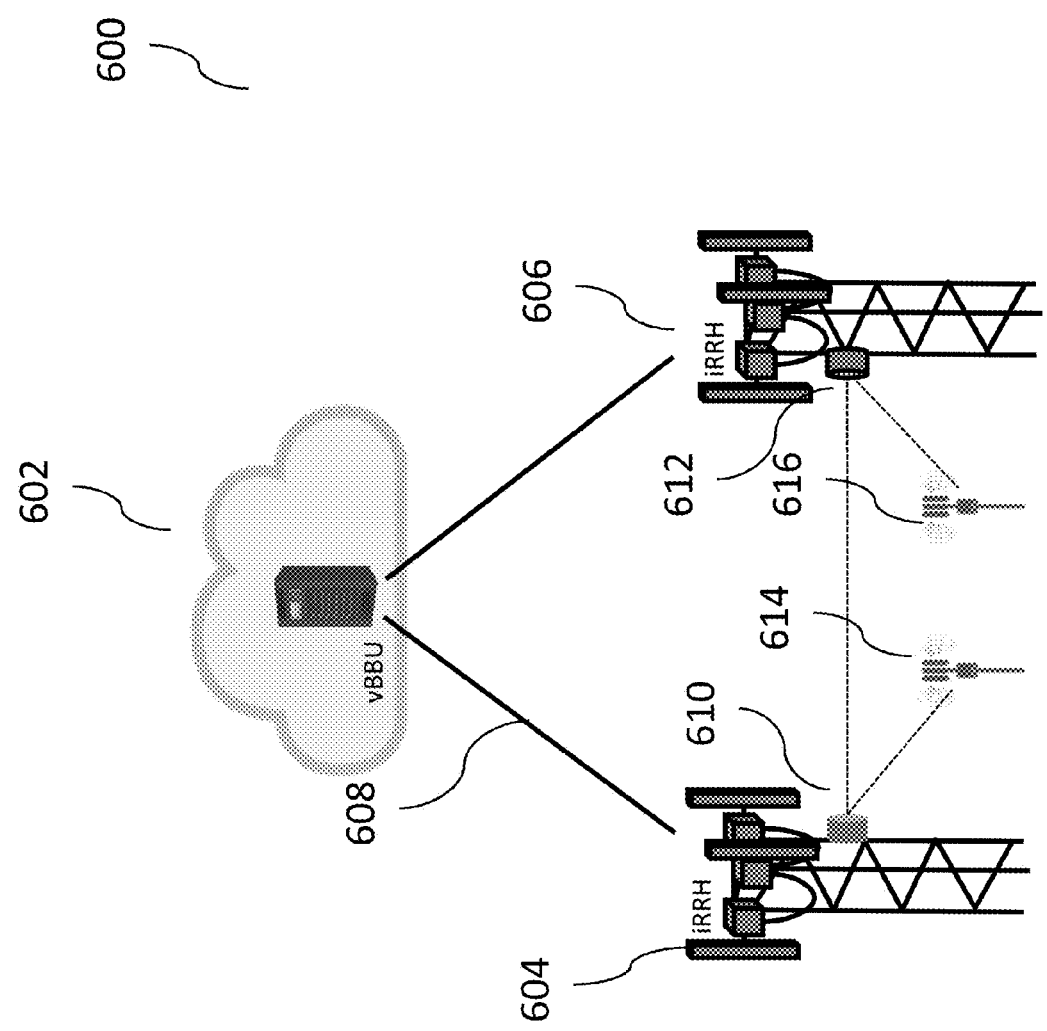
FIG. 6 illustrates an exemplary carrier aggregation architecture.

FIG. 6 illustrates a carrier aggregation architecture 600. The architecture 600 can include an intelligent baseband unit (e.g., vBBU) 602 and remote radio heads 604 and 606. The vBBU 602 can be communicatively coupled to the iRRH 604, 606 using fronthaul (e.g., Ethernet) connections 608. The iRRH 604, 608 can implement communication interfaces 610, 612, respectively. The interfaces 610, 612 can provide communications between the iRRHs 604 and 606. Similar interfaces can be also provided for communications between iRRH 604 and iRRH 614 as well as well iRRH 606 and iRRH 616, and/or any other iRRH. Exemplary interfaces and their operation for allowing communication between iRRHs are described in co-pending, co-owned, U.S. patent application Ser. No. 14/179,421, filed Feb. 12, 2014 to Dahod et al., and entitled "Long Term Evolution Radio Access Network," which claims priority to U.S. Provisional Patent Application No. 61/763,927, filed Feb. 12, 2013, and entitled "Long Term Evolution (LTE) Radio Access Network (Ran) Architecture," and the disclosures of which are incorporated herein by reference in their entireties. The interfaces 610, 612 can allow for improved communications between iRRHs, which can be part of the same sector and/or part of different sectors (that may be served by different vBBUs). A lower latency can be associated with such interfaces (e.g., 4 ms; if latency is less than 4 ms, then no direct transport over the interface is required) as compared to fronthaul interfaces (e.g., 10 ms). This can affect scheduling of carriers in a particular cell site.

Figure 7A:
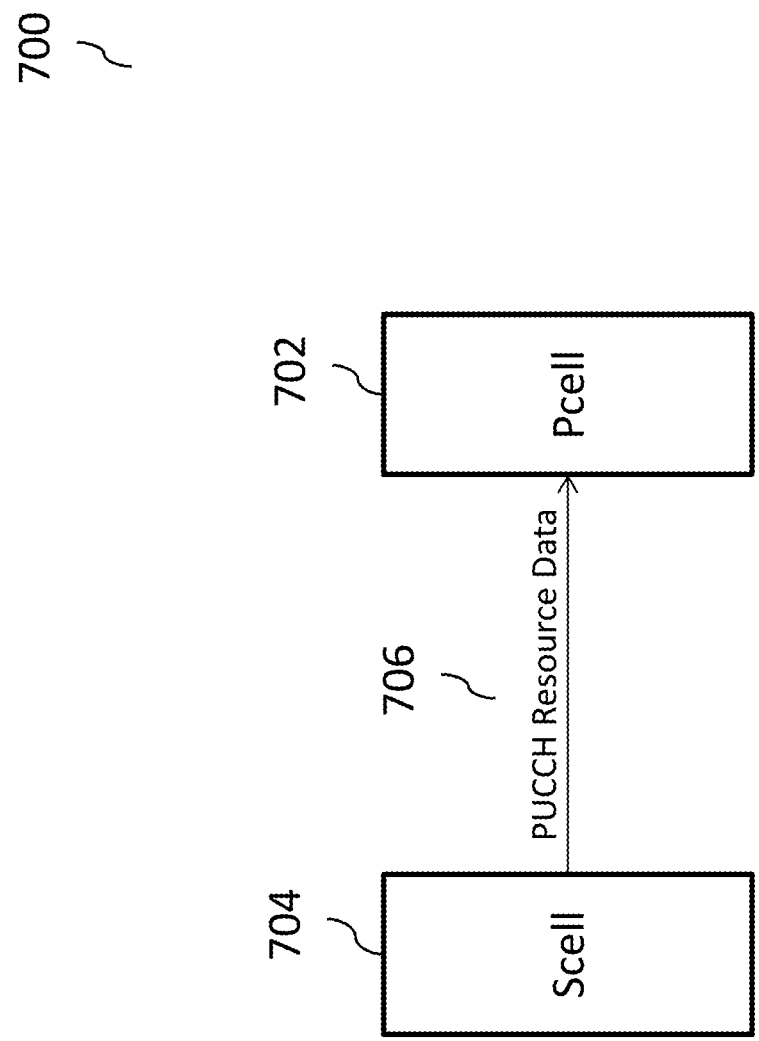
FIG. 7a illustrates an exemplary carrier aggregation system showing latency requirements for a hybrid automatic repeat request ("HARQ")

FIG. 7a illustrates an exemplary carrier aggregation system 700 showing latency requirements for a hybrid automatic repeat request ("HARQ"). HARQ can be used to provide high speed data transmission on downlink and uplink connections in wireless communications networks as well as detect and correct error packets in the physical layer ("PHY"). For example, if the received data contains an error then a receiver can buffer the data and request a re-transmission from a sender. When the receiver receives the re-transmitted data, it can combine it with buffered data prior to channel decoding and error detection. HARQ can be used to improve performance of re-transmissions. Further, using HARQ, original data can be encoded using a forward error correction ("FEC") code. Parity bits can be either immediately transmitted with a message and/or only transmitted upon request when a receiver detects an erroneous message. The FEC code can be selected to correct an expected subset of all errors that may occur.

The system 700 can include a primary cell (PCell) 702 and a secondary cell (SCell) 704 that can be communicatively coupled using an interface 706. The system 700 can be an inter-site carrier aggregation system, where PCell 702 may need to know the location of PUCCH resource for SCell 704 transmissions. Using interface 706 (e.g., which can be similar to interfaces 610, 612 shown in FIG. 6), the SCell 704 can provide control (i.e., PUCCH) resource information to the PCell 702. Once SCell sends a downlink transmission (e.g., a downlink transport block), a HARQ ACK can be sent 4 ms thereafter. However, PCell would not know that SCell has sent a transmission.

FIG. 7b illustrates exemplary operation process 710 of the system 700 shown in FIG. 7a. During process 710, a user equipment (UE) can be communicatively coupled with an eNodeB (eNB), where PCell 702 and/or SCell 704 shown in FIG. 7 can be used to provide connections to the user equipment. Process 712 corresponds to the eNodeB HARQ process and process 714 corresponds to the user equipment HARQ process.

As shown in FIG. 7b, sub-frames 712 n−1, n, n+1, n+2, . . . , n+7 . . . (n is an integer) can be transmitted by the SCell 704 to the user equipment on the downlink 718. Upon receipt of the sub-frames 712, the user equipment can process the sub-frames during UE processing time 720 (e.g., 4 ms). Once the UE has processed the sub-frames, it can send a HARQ ACK/NACK (i.e., acknowledgement/non-acknowledgement of receipt of a sub-frame) 722 to the PCell 702 (shown in FIG. 7a). However, in some cases, the PCell 702 might not be aware of the original transmission 718 by the SCell 704 to the user equipment. The PCell 702 can require an indication of the PUCCH resources at less than 4 ms intervals. This can cause issues for some carriers that are not able to accommodate the 4 ms rule by the PCell 702.

Figure 8:
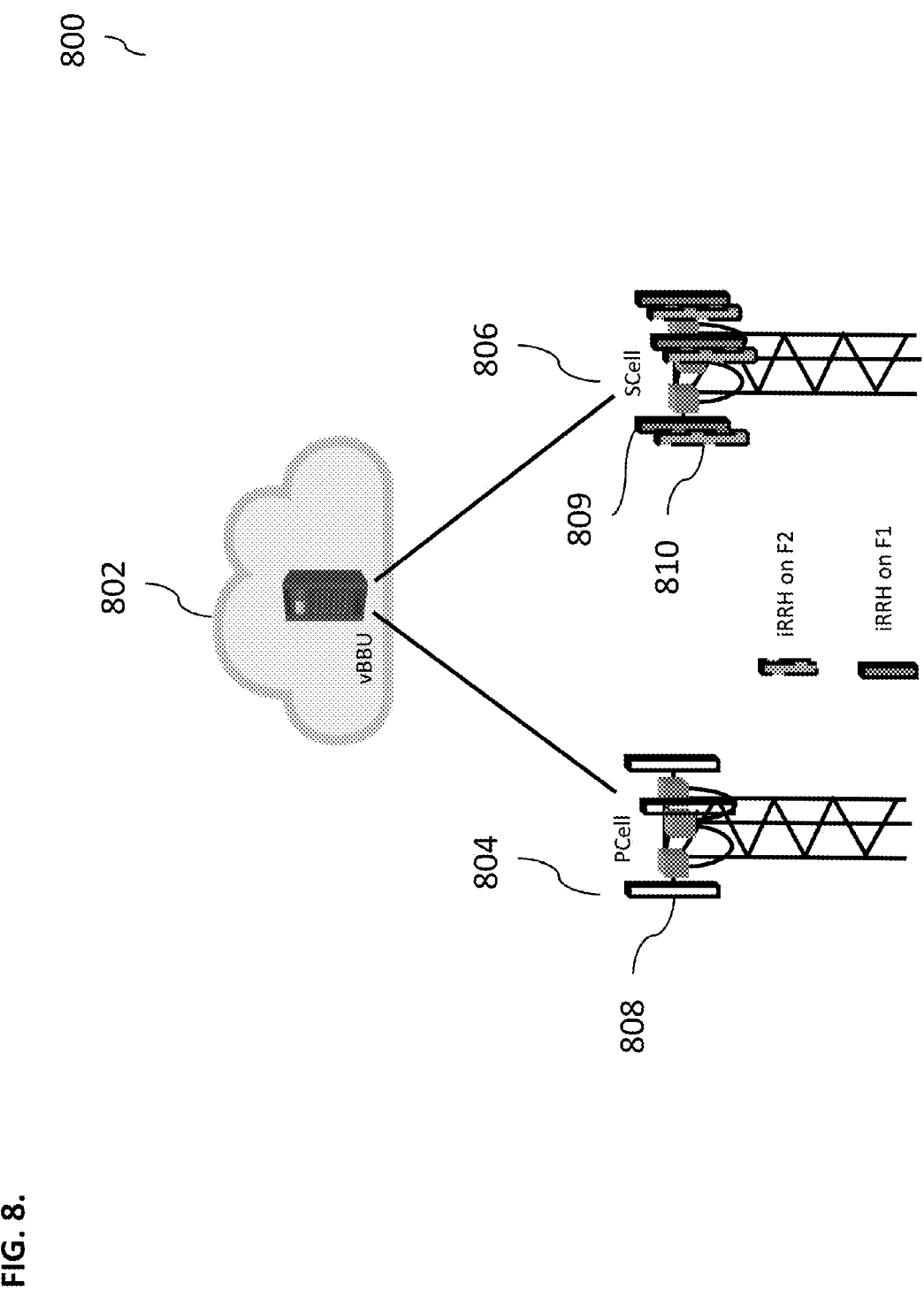
FIG. 8 illustrates an exemplary system that can provide for inter-site carrier aggregation with control channel (PUCCH) listening, according to some implementations of the current subject matter.

FIG. 8 illustrates an exemplary system 800 that can provide for inter-site carrier aggregation with control channel (PUCCH) listening or sniffing, according to some implementations of the current subject matter. The system 800 can include a vBBU 802, a PCell 804 and SCell 806. The vBBU 802 can be communicatively coupled to the PCell 804 and SCell 806 using a fronthaul connection (e.g., Ethernet connection). The PCell 804 can include an iRRH 808 and the SCell 806 can include an iRRH 809. The iRRHs 808, 809 can be configured to communicate using an interface discussed above. The communication between iRRHs 808, 809 can occur using a predetermined frequency band, e.g., frequency band F1.

In some implementations, in order to provide listening capabilities to the SCell 806 for the purposes of determining available physical uplink control channel resources of the PCell 804, the SCell 806 can include an additional iRRH 810. The iRRH 810 can be configured to communicate using a different predetermined frequency band, e.g., a frequency band F2 The inclusion of the additional iRRH 810 can provide for control channel (PUCCH) listening capabilities at the SCell 806. Further, using the system 800, the PCell 804 can be made aware of the transmissions between SCell 806 and a user equipment.

In some implementations, using the system 800, a user equipment can transmit uplink control information ("UCI") to the eNodeB. The UCI information can be included in PUCCH information. It can include information that eNodeB can require from the user equipment in order to determine what the user equipment requires. The UCI can also carry various other information, such as, channel quality information that the user equipment may be seeing on the downlink. In particular, the UCI can include channel quality information ("CSI"), scheduling requests ("SR"), and HARQ ACK/NACK. The channel state information can include channel quality information ("CQI"), rank indicator ("RI"), and precoding matrix ("PMI"). The CQI can inform the eNodeB about downlink channel quality that the user equipment may be observing; the RI can include control information that is transmitted from the user equipment to eNodeB for the purposes of selecting downlink transmission layers; and PMI can determine mapping of individual layers to antennas. The scheduling requests can include information about transmissions of user equipment's scheduling requests to the eNodeB to obtain PUSCH/PUCCH resources for transmission of new control plane and/or user plane data. The HARQ ACK/NACK, as stated above, inform the eNodeB whether downlink data was correctly received. Various PUCCH formats (e.g., Formats 1, 1a, 1b, 2, 2a, 2b, and 3, as outlined in the LTE standard) can be used to transmit different combinations of the above data. For example, PUCCH Format 1 is used to transmit scheduling requests; PUCCH Format 3 can be used to transmit UCI information that can contain up to 10 bit HARQ ACK with/without 1 bit SR. It can use 48 bits per TTI and quadrature phase-shift keying ("QPSK") modulation scheme for the purposes of transmission. A single PUCCH transmission can occupy two resource blocks. In some implementations, a user equipment (not shown in FIG. 8) can utilize PUCCH Format 3 to transmit uplink control information to the eNodeB. Further, the system 800 can also support user equipment's simultaneous requests for PUSCH and PUCCH resources. Using the iRRHs 809 and 810 located at the SCell 806, the system 800 can also improve latency that may be associated with fronthaul communications.

Figure 9:
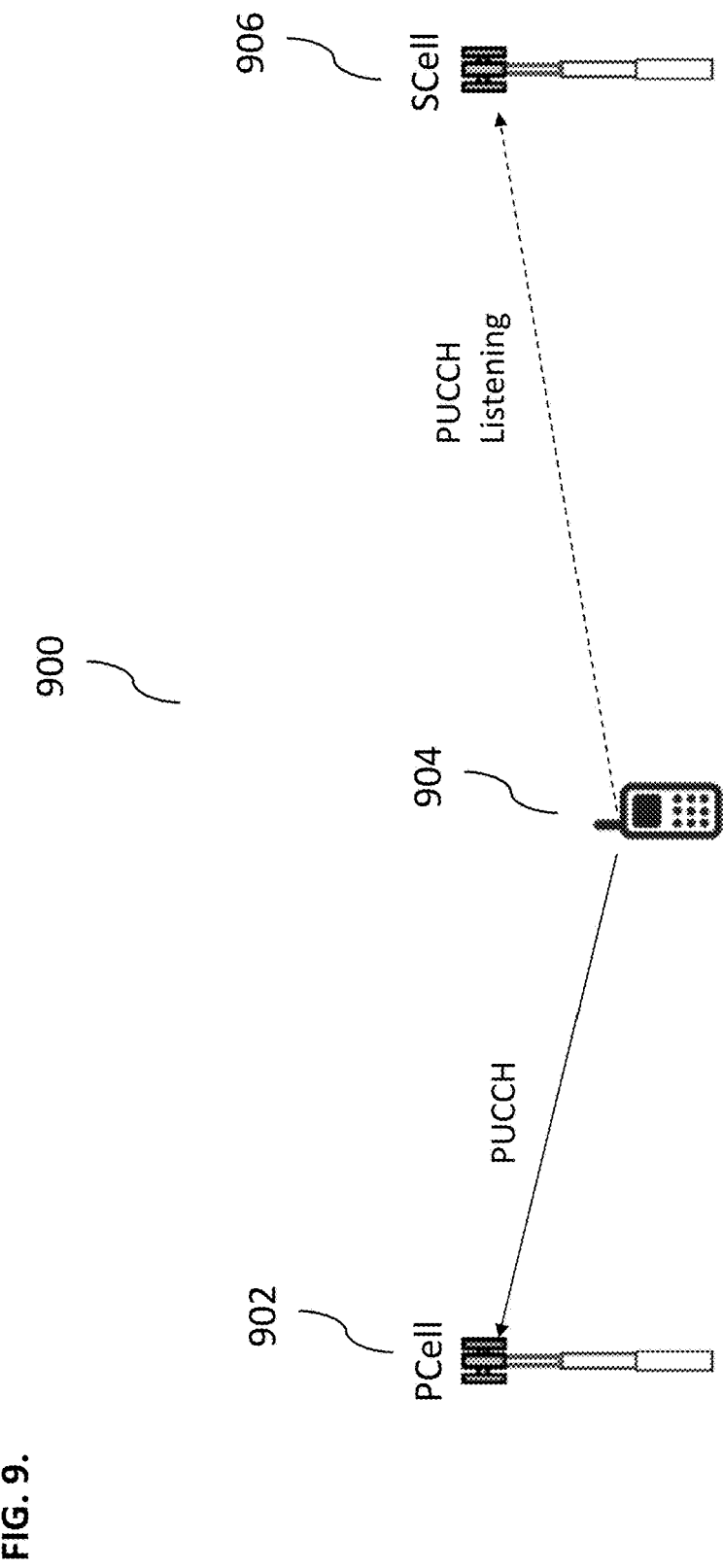
FIG. 9 illustrates an exemplary system that can provide for inter-site carrier aggregation with control channel (PUCCH) listening, according to some implementations of the current subject matter.

FIG. 9 illustrates additional details of using the system 800 shown in FIG. 8, according to some implementations of the current subject matter. The system 900 shown in FIG. 9 can include a PCell 902 (which can be similar to PCell 804), a user equipment 904, and a SCell 906 (which can be similar to SCell 806). The PCell 902 and the SCell 906 can be communicatively coupled using an interface discussed above, where SCell 906 can provide an additional coverage to the user equipment 904. To allow for listening or monitoring of the PUCCH resources that are being provided to the user equipment 904, the SCell 906 can include additional iRRH hardware/software capabilities (e.g., similar to iRRHs 809, 810, as shown in FIG. 8).

The user equipment 904 can be communicatively coupled to both the PCell 902 and the SCell 906. In some implementations, control channel resources at PCell 906 can be determined (e.g., using the SCell 906). Once the available control channel resources at PCell 906 are ascertained, the resources can be provided to SCell 902. The resources can then be utilized for transmission of data packets to the user equipment 904 using SCell 902.

In some implementations, the user equipment 904 can transmit uplink control information (as discussed above) to the PCell 902 (which can be communicatively coupled via a fronthaul connection to a vBBU (e.g., vBBU 802 as shown in FIG. 8). In some implementations, the user equipment 904 can transmit HARQ ACK/NACK as well as CQI, PMI, RI on an uplink communication to the PCell 902 only. The user equipment can also monitor a downlink control channel for any downlink allocations by the eNodeB and decode downlink transport blocks on the PDSCH of the SCell 906.

In some implementations, to ensure efficiency of the system, the uplink control information can be provided to the SCell 906. The control information can be transmitted by the vBBU (e.g., vBBU 802 shown in FIG. 8) to the SCell 906. Alternatively, PCell 902 can decode and transmit control information to SCell 906. This can be helpful in situations where fronthaul conditions between the vBBU and SCell 906 are not ideal for transmission of control information.

In some implementations, to avoid transmission of control information on the fronthaul connection between vBBU and SCell 906, the SCell can monitor available PUCCH resources of PCell 902 (and/or any other PCells that it may be communicatively coupled to). Upon detection of available control resources, these resources can be provided via the connection between the user equipment 904 and the SCell 906. Further, the user equipment 904 can utilize a resource index for HARQ ACK/NACK. The use of the index can be performed per each RRC connection.

In some implementations, PUCCH monitoring that can be performed by SCell 906 does not interfere with PCell 902's normal operation. This means that PCell 902 can decode and transmit control information on the fronthaul to the SCell 906 without interference to its own operation. In case of discontinuous transmission ("DTX") or NACKs, the SCell 906 can utilize a slower decode mode. Additionally, intra-frequency deployment can ensure that no additional receiver capability is needed among the co-operating cells.

Figure 10:
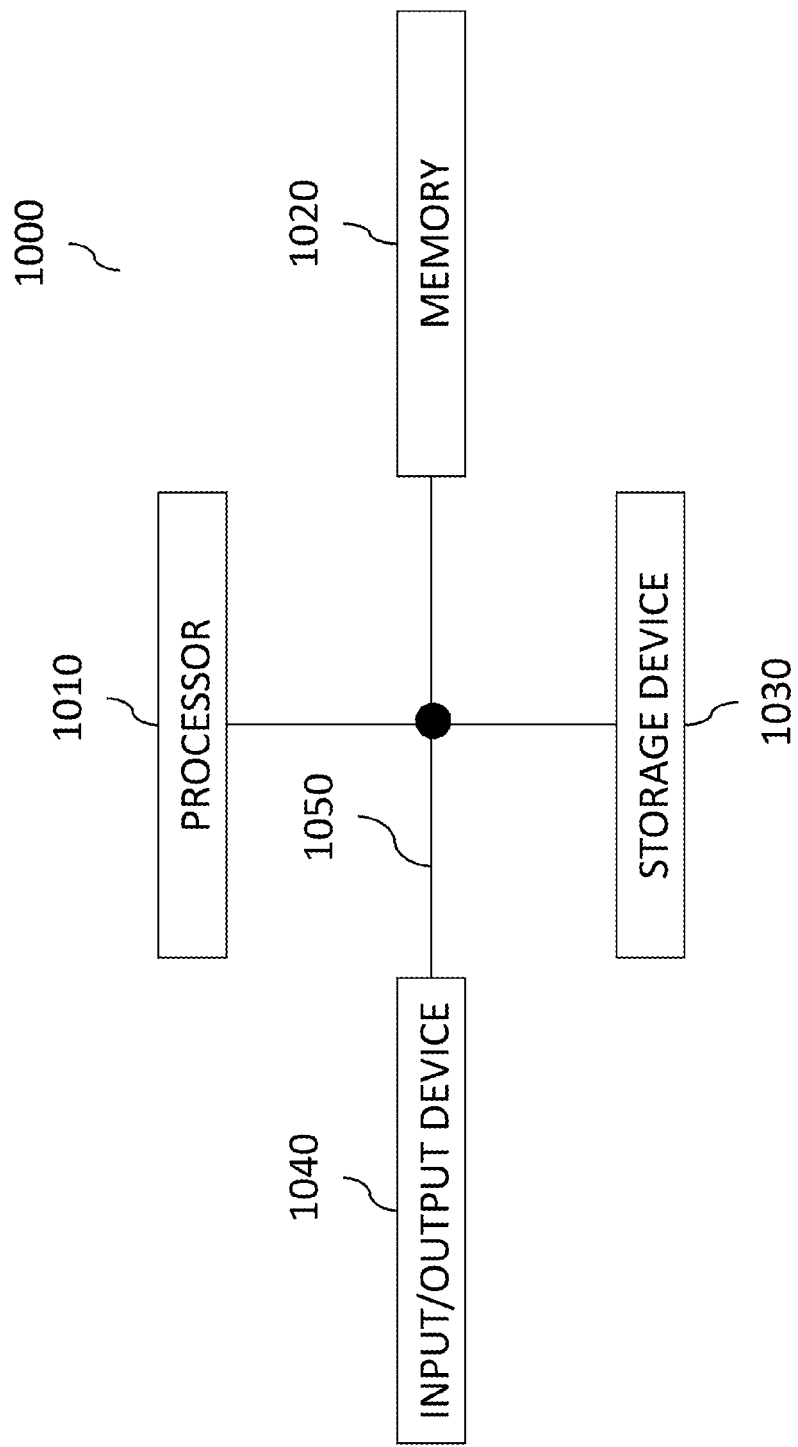
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 600. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/ output device 1040 can include a keyboard and/or pointing device. In alternate implementations, the input/output device 1040 can include a display unit for displaying graphical user interfaces.

Figure 11:
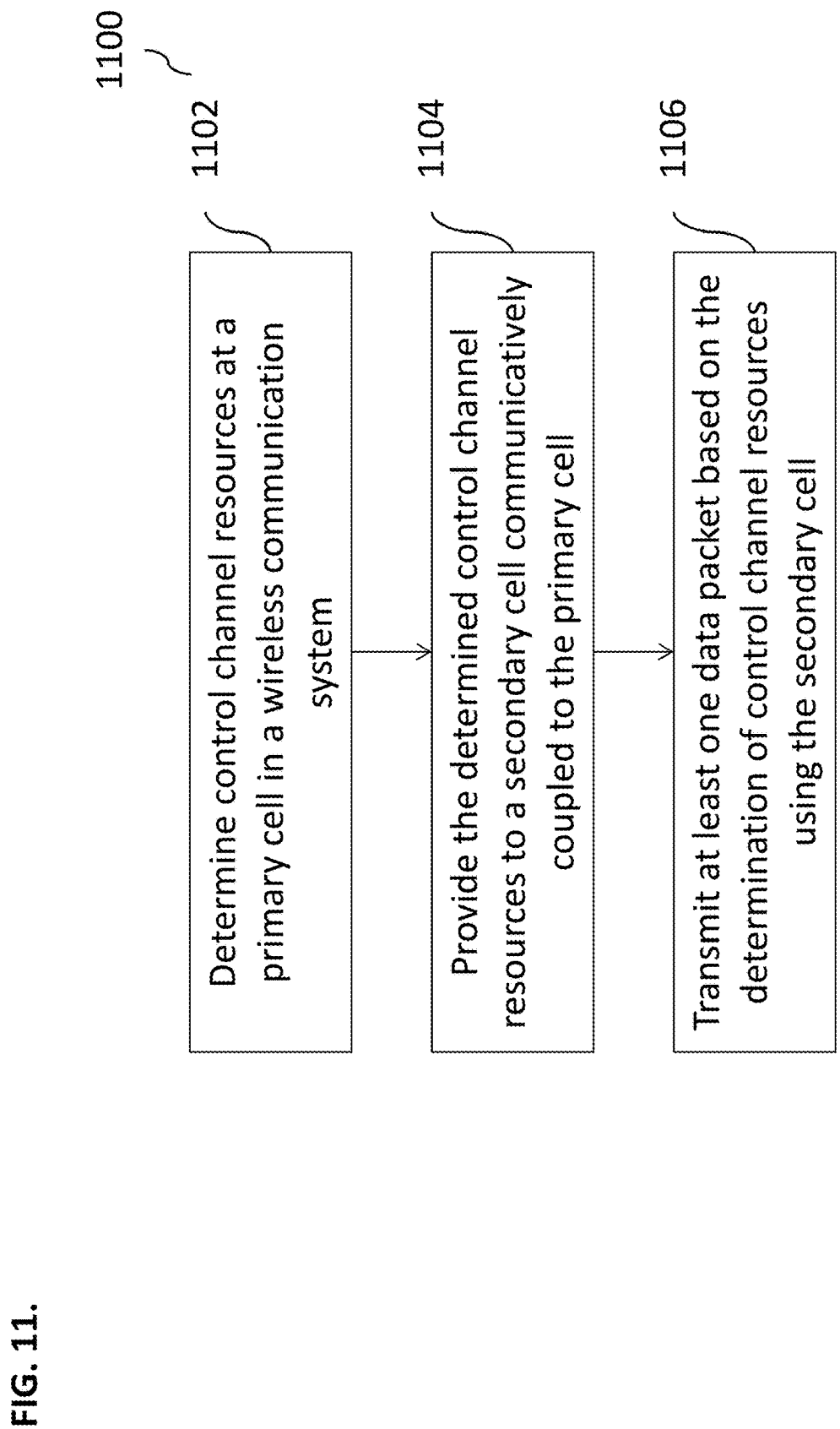
FIG. 11 illustrates an exemplary method, according to some implementations of the current subject matter.

FIG. 11 illustrates an exemplary method 1100 for providing an inter-site carrier aggregation with control channel listening, according to some implementations of the current subject matter. At 1102, control channel resources at a primary cell in a wireless communication system can be determined. At 1104, the determined control channel resources can be provided to a secondary cell communicatively coupled to the primary cell. At 1106, at least one data packet can be transmitted based on the determination of control channel resources using the secondary cell.

In some implementations, the current subject matter can include one or more of the following optional features. The primary cell (e.g., primary cell 902) and the second cell (e.g., secondary cell 906) can include at least a portion of an evolved node (eNodeB) base station. The primary cell and the secondary cell can include a remote radio head. The remote radio head can include a radio transmitter and a radio receiver. In some implementations, the secondary cell can include a first remote radio head and a second remote radio head. One of the first and second remote radio heads can be used to communicate with the primary cell and, while the other can be used to communicate with a user equipment. Alternatively, one or both remote radio heads can communicate with both the primary cell and the user equipment.

In some implementations, the primary cell and the secondary cell can include at least one of the following: a portion of a macro base station, a portion of a micro base station, a portion of a femto base station, a portion of a pico base station, and any combination thereof.

In some implementations, the method can include receiving, by one of the primary cell and the secondary cell, a control channel information from a user equipment, determining, based on the receiving, the control channel resources, transmitting, by the primary cell, the determined control channel resources to the secondary cell, and utilizing, by the secondary cell, the determined control channel resources for transmission of the data packet(s) between the secondary cell and the user equipment. The method can also include receiving, using one of the primary cell and the secondary cell, physical uplink control channel and physical uplink shared channel information.

In some implementations, the method 1100 can be performed using inter-site carrier aggregation.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising
   determining, at a secondary cell, on a control channel, receipt of a transmission feedback information by a primary cell in a wireless communication system, the secondary cell being communicatively coupled to the primary cell;
   transmitting, based on the determining, at least one data packet using the secondary cell;
   receiving, by at least one of the primary cell and the secondary cell, a control channel information from a user equipment;
   transmitting, on the control channel of the primary cell, the determined feedback information to the secondary cell; and
   utilizing, by the secondary cell, the determined feedback information for transmission of the at least one data packet between the secondary cell and the user equipment.

2. The method according to claim 1, wherein the primary cell and the second cell comprise at least a portion of an evolved node (eNodeB) base station.

3. The method according to claim 2, wherein the primary cell and the secondary cell comprise a remote radio head, the remote radio head including a radio transmitter and a radio receiver.

4. The method according to claim 3, wherein the secondary cell includes a first remote radio head and a second remote radio head, wherein at least one of the first remote radio head and the second remote radio head communicate with the at least one of the primary cell and a user equipment.

5. The method according to claim 1, wherein the primary cell and the secondary cell include at least one of the following: a portion of a macro base station, a portion of a micro base station, a portion of a femto base station, a portion of a pico base station, and any combination thereof.

6. The method according to claim 1, further comprising
   receiving, using at least one of the primary cell and the secondary cell, physical uplink control channel and physical uplink shared channel information.

7. The method according to claim 1, wherein at least one of the determining, the providing, and the transmitting is performed using inter-site carrier aggregation.

8. A system comprising:
   at least one programmable processor; and
   a machine-readable medium storing instructions that, when executed by the at least one programmable processor, cause the at least one programmable processor to perform operations comprising:
      determining, at a secondary cell, on a control channel, receipt of a transmission feedback information by a primary cell in a wireless communication system, the secondary cell being communicatively coupled to the primary cell;
      transmitting, based on the determining, at least one data packet using the secondary cell;
      receiving, by at least one of the primary cell and the secondary cell, a control channel information from a user equipment;
      transmitting, on the control channel of the primary cell, the determined feedback information to the secondary cell; and
      utilizing, by the secondary cell, the determined feedback information for transmission of the at least one data packet between the secondary cell and the user equipment.

9. The system according to claim 8, wherein the primary cell and the second cell comprise at least a portion of an evolved node (eNodeB) base station.

10. The system according to claim 9, wherein the primary cell and the secondary cell comprise a remote radio head, the remote radio head including a radio transmitter and a radio receiver.

11. The system according to claim 10, wherein the secondary cell includes a first remote radio head and a second remote radio head, wherein at least one of the first remote radio head and the second remote radio head communicate with the at least one of the primary cell and a user equipment.

12. The system according to claim 8, wherein the primary cell and the secondary cell include at least one of the following: a portion of a macro base station, a portion of a micro base station, a portion of a femto base station, a portion of a pico base station, and any combination thereof.

13. The system according to claim 8, wherein the operations further comprise receiving, using at least one of the primary cell and the secondary cell, physical uplink control channel and physical uplink shared channel information.

14. The system according to claim 8, wherein at least one of the determining, the providing, and the transmitting is performed using inter-site carrier aggregation.

15. A computer program product comprising a non-transitory machine-readable medium storing instructions that, when executed by at least one programmable processor, cause the at least one programmable processor to perform operations comprising:
 determining, at a secondary cell, on a control channel receipt of a transmission feedback information by a primary cell in a wireless communication system, the secondary cell being communicatively coupled to the primary cell;
 transmitting, based on the determining, at least one data packet using the secondary cell;
 receiving, by at least one of the primary cell and the secondary cell, a control channel information from a user equipment
 transmitting, on the control channel of the primary cell, the determined feedback information to the secondary cell;
 utilizing, by the secondary cell, the determined feedback information for transmission of the at least one data packet between the secondary cell and the user equipment.

16. The computer program product according to claim 15, wherein the primary cell and the second cell comprise at least a portion of an evolved node (eNodeB) base station.

17. The computer program product according to claim 16, wherein the primary cell and the secondary cell comprise a remote radio head, the remote radio head including a radio transmitter and a radio receiver.

18. The computer program product according to claim 17, wherein the secondary cell includes a first remote radio head and a second remote radio head, wherein at least one of the first remote radio head and the second remote radio head communicate with the at least one of the primary cell and a user equipment.

19. The computer program product according to claim 15, wherein the primary cell and the secondary cell include at least one of the following: a portion of a macro base station, a portion of a micro base station, a portion of a femto base station, a portion of a pico base station, and any combination thereof.

20. The computer program product according to claim 15, wherein the operations further comprise
 receiving, using at least one of the primary cell and the secondary cell, physical uplink control channel and physical uplink shared channel information.

21. The computer program product according to claim 15, wherein at least one of the determining, the providing, and the transmitting is performed using inter-site carrier aggregation.

22. The method according to claim 1, wherein the feedback information includes at least one of the following: an acknowledgement of the transmission and a non-acknowledgement of the transmission.

23. The system according to claim 8, wherein the feedback information includes at least one of the following: an acknowledgement of the transmission and a non-acknowledgement of the transmission.

24. The computer program product according to claim 15, wherein the feedback information includes at least one of the following: an acknowledgement of the transmission and a non-acknowledgement of the transmission.

\* \* \* \* \*